United States Patent [19]
Gault

[11] Patent Number: 5,428,348
[45] Date of Patent: Jun. 27, 1995

[54] FLUID LEVEL MONITOR

[75] Inventor: Robert L. Gault, Garden City, Mich.

[73] Assignee: Holiday Safety, Inc., Harrisville, Mich.

[21] Appl. No.: 113,992

[22] Filed: Aug. 30, 1993

[51] Int. Cl.⁶ .............................................. G08B 21/00
[52] U.S. Cl. ..................... 340/618; 340/620; 324/694; 73/304 R
[58] Field of Search ............... 340/604, 605, 628, 618, 340/620; 324/691, 693, 694; 73/304 R, 313, 314

[56] References Cited

U.S. PATENT DOCUMENTS

| | | | |
|---|---|---|---|
| 4,216,468 | 8/1980 | Kaufmann | 340/620 |
| 4,623,878 | 11/1986 | Schoenwetter | 340/628 |
| 4,796,017 | 1/1989 | Merenda | 340/620 |

OTHER PUBLICATIONS

"Liquid Level Sensor", FIG. 32-3, pp. 186, Encyclopedia of Electrical Circuits, Graf and Sheets, 1992 (Elector).

Primary Examiner—Jeffery A. Hofsass
Attorney, Agent, or Firm—George L. Boller

[57] ABSTRACT

A battery-operated fluid level monitor has a novel circuit and sensor for providing signals, both audible and visible, for indicating low fluid level, low battery voltage, and proper fluid level. The monitor is useful as a device that can inform when a Christmas tree needs water. The monitor can also be economically fabricated, and this is important for mass production applications, such as a Christmas tree monitor.

15 Claims, 4 Drawing Sheets

LOW WATER ALARM SCHEMATIC 5,428,348

FLUID LEVEL MONITOR

FIELD OF THE INVENTION

This invention relates to a fluid level monitor, and in a specific application to a fluid level monitor for the water level in a Christmas tree stand.

BACKGROUND AND SUMMARY OF THE INVENTION

When a freshly cut Christmas tree is placed in a stand, it initially consumes substantial quantities of water. The amount of water consumed however gradually diminishes with time. A typical Christmas tree stand is capable of holding only a limited amount of water, and therefore the water must be replenished fairly frequently, at least initially. The interior of a home in winter in a cold weather climate is also apt to have low humidity, and this can accelerate the loss of water. If a stand goes dry, the cut in the tree trunk also begins to dry to the detriment of the tree's vitality. Since the holiday season is often a busy time of year in many households, checking of the water level in a Christmas tree stand may be inadvertently neglected. In order to assist in maintaining the vitality of a cut tree for as long as possible, it has been proposed to provide a monitor for checking the water level in the stand. The monitor delivers a signal when the water drops to a level where it should be replenished.

The present invention is directed to a new and unique fluid level monitor that offers particular advantages for use with a Christmas stand, although uses of the invention can extend beyond this specific application.

For use with a Christmas tree stand, it is desirable that a fluid level monitor be battery operated. One reason for doing this is so that the monitor can continue to perform its monitoring function even when electric lights on the tree are turned off. In one respect the present invention provides a fluid level monitor that is battery operated. In the embodiment that is to be specifically disclosed herein, the monitor is powered by a conventional nine volt DC battery.

When a battery is used for powering the monitor, it is desirable that the battery voltage itself be monitored so that the opportunity will be available for an old battery to be replaced by a fresh one a certain amount of time before the monitoring function ceases due to low battery voltage. Another aspect of the invention relates to a battery-powered fluid level monitor in which the battery voltage is also monitored so that an opportunity is presented for replacing a weak battery that is in use before the battery ceases to be capable of operating the monitor.

A further aspect of the invention relates to the manner in which the monitor presents signals for conveying information about the status of the water level being monitored and of the monitor itself. This aspect includes both audible and visible signals that are uniquely related, and the electronic circuitry that is used to give these signals.

A still further aspect of the invention relates to the sensor that is disposed in the fluid whose level is being monitored. It is important that the sensor be sturdy enough to withstand the typical handling that is expected to encounter when placed in and removed from the fluid. It must also be capable of providing service in a fluid that is subject to the type of contamination that occurs when the cut trunk of a tree is placed in a stand of water. Should the sensor become contaminated, it should be able to be cleaned without unduly difficult procedures. And the de-fouling of the sensor should not expose the sensor to risk of damage.

When the invention is applied to a consumer product, as it would be when used for a Christmas tree stand, it must be cost-effective. The electronic circuitry that is used in the disclosed embodiment can be fabricated with the use of a fairly small number of commercially available components. Likewise the sensor is well suited for mass-production fabrication at a very reasonable cost, especially when compared to other commercially available sensors, or probes that are used for fluid level monitoring.

A still further feature of the invention relates to an implementation for a Christmas tree stand that divides the device into a first module that contains the electronics, and a second module that contains only the visible signal indicators and is plugged into the first module. The second module may be fabricated as a decorative ornament for attachment to the tree, while the first module is located elsewhere, such as being integrated into the stand itself, or in some way mounted on the stand. The first module could alternatively be located remote from the stand and tree.

The foregoing features, advantages, and benefits of the invention, along with additional ones, will be seen in the ensuing description and claims which should be considered in conjunction with the accompanying drawings. The drawings disclose a presently preferred embodiment of the invention according to the best mode contemplated at this time for carrying out the invention.

DESCRIPTION OF THE PREFERRED EMBODIMENT

Figure 1:
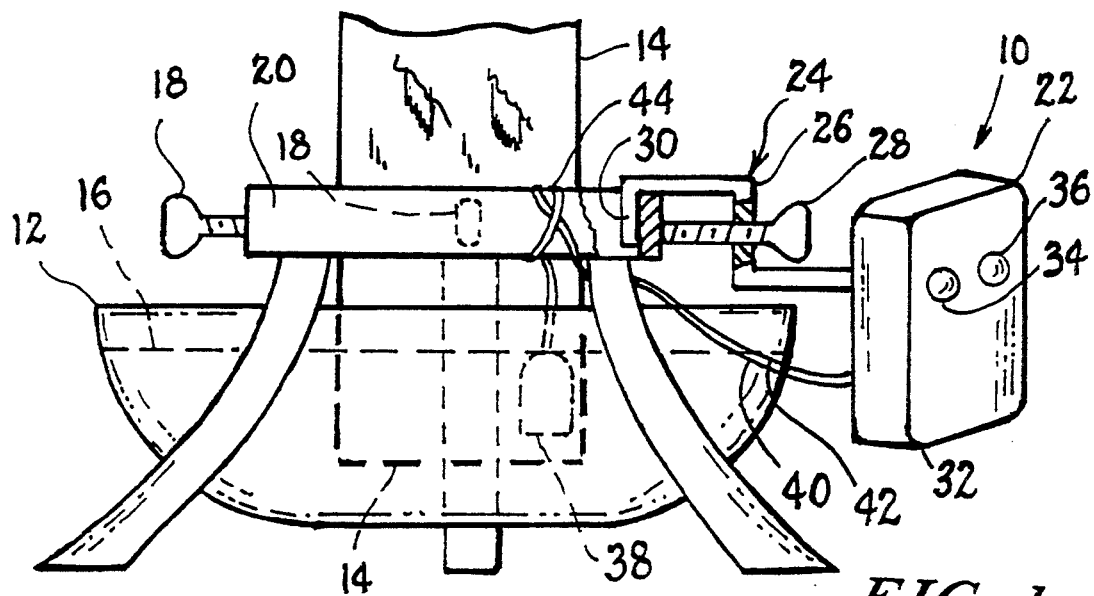
FIG. 1 is a view of a first embodiment of the invention operatively associated with a Christmas tree stand.

FIG. 1 shows a first embodiment of fluid level monitor 10 operatively associated with a representative Christmas tree stand 12. The cut end of a tree 14 is disposed in water 16 in stand 12, and the upright tree trunk is securely clamped by the usual set of four thumbscrews 18 that are threaded into through-holes in a ring 20 of the stand.

Monitor 10 comprises a module 22 that is mounted on ring 20 by a clamp mechanism 24 which comprises a formed metal bracket 26 and a thumbscrew 28. The far end of bracket 26 is placed over the upper edge of ring 20 as shown such that the sides of ring 20 are between a flange 30 at the extreme far end of bracket 26 and the tip end of the shank of thumbscrew 28. The thumbscrew is tightened to clamp the ring between flange 20 and the tip end of the thumbscrew shank.

Module 22 comprises a housing 32 enclosing an electronic circuit board assembly. Mounted on the circuit board assembly are two indicator lamps in the form of respective light emitting diodes (LED's) 34, 36. Each LED registers with a respective aperture in the wall of housing 32 to make both LED's visible from the front of module 22 when mounted on a tree stand as shown. Also mounted on the electronic circuit board assembly is a buzzer (64 in FIGS. 4 and 5) that provides audible signals.

Monitor 10 further comprises a sensor 38 that is suspended in water 16 and connected by means of a pair of insulated lead wires 40, 42 with the circuit board assembly contained within housing 32, the lead wires passing through a small aperture in the wall of the housing. Sensor 38 is suspended such that it is disposed at a certain level within the stand for sensing when the water level drops below a level that is somewhat above the level at which the cut end of tree 14 would cease to be in water. As will be explained later on in connection with the description of FIGS. 4 and 5, LED's 34, 36 provide visible signals relating to the status of both monitor 10 and the level of water in stand 12. One way of suspending sensor 38, as shown by FIG. 1, comprises looping lead wires 40, 42 over ring 20 so that sensor 38 is at the desired level within stand 12 and then securing them in place, such as through the use of a tie 44 that wraps around the lead wires and the ring.

Figure 2:
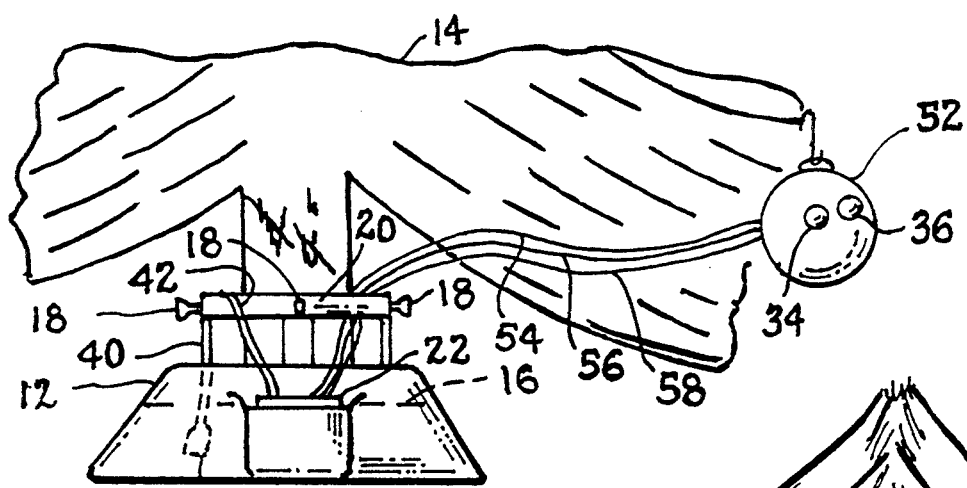
FIG. 2 is a view of a second embodiment.

FIG. 2 shows a second embodiment of monitor 50 which is like monitor 10 insofar as the level monitoring function is concerned, but which differs in some respects. In monitor 50, module 22 is situated in a receptacle that is provided for that purpose in stand 12. LED's 34, 36 are removed from their mounting on the circuit board assembly by insulated lead wires 54, 56, 58, one of these being a common supply wire.

Figure 3:
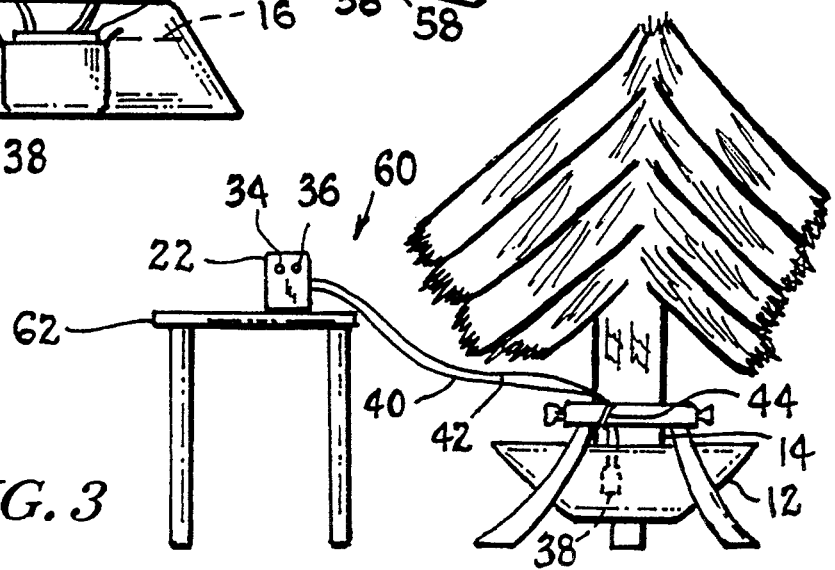
FIG. 3 is a view of a third embodiment.

FIG. 3 shows a third embodiment of monitor 60 which is like the first two embodiments insofar as performing the level sensing function is concerned, but which differs from them in certain constructional respects. In monitor 60, module 22 is located remote from stand 12, such as being placed on a table 62 next to tree 14. LED's 34, 36 are mounted on the circuit board assembly within housing 32 in the same manner as in the first embodiment 10. The lengths of the sensor lead wires 40, 42 are sufficiently long to allow for the remote positioning of module 22.

Figure 4:
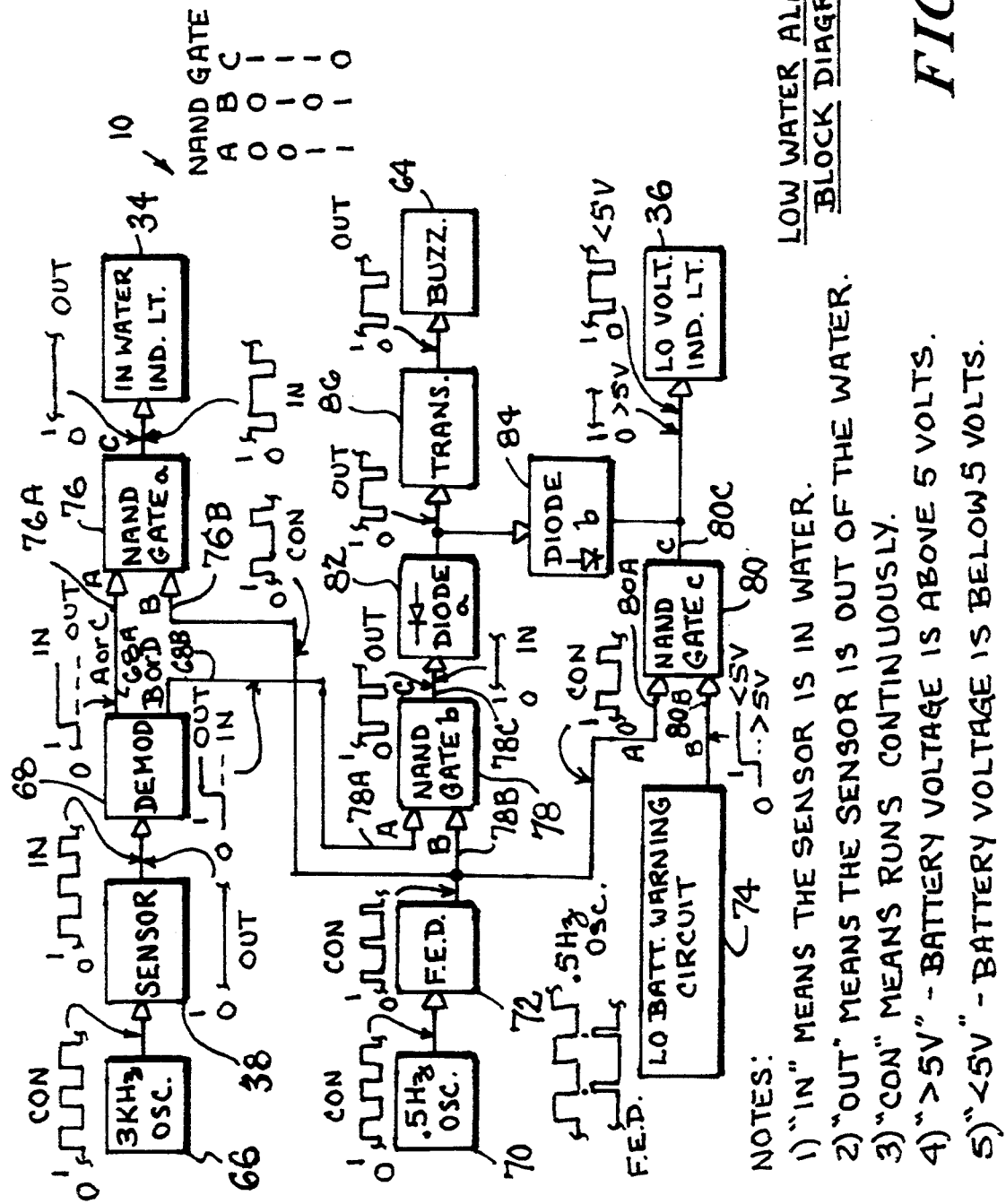
FIG. 4 is a block diagram of the electronic circuitry that is applicable to all embodiments.

FIG. 4 is a block diagram of electronic circuitry on the circuit board assembly that is within housing 32. LED 34 is an indicator for indicating whether sensor 38 is in or out of water 16. When sensor 38 is in water, LED 34 blinks intermittently; when sensor 38 is out of water, LED 34 stays off continuously. LED 36 is an indicator for indicating whether the voltage of a D.C. battery that powers the electronic circuitry is above or below a certain threshold. When battery voltage is above the threshold and sensor 38 is in water, LED 36 stays off while LED 34 blinks intermittently; when battery voltage is below the threshold, LED 36 blinks intermittently regardless of whether sensor 38 is in or out of water. Monitor 10 also comprises a buzzer 64 whose primary purpose is to emit an audible signal when the sensor is out of water in order to alert persons both in and beyond in the immediate vicinity that the water in the stand is in need of replenishing. When the sensor is in water, buzzer 64 will perform a secondary function of operating synchronously with LED 36 when the battery voltage is below the threshold. When the battery voltage is below the threshold and the sensor is out of water, both buzzer 64 and LED 36 will operate in synchronism, but the fact that LED 34 is off, (i.e., not blinking) will reveal that both low water level and low battery voltage are causing buzzer 64 to emit a signal. Buzzer 64 also operates when sensor 38 is out of water, and the fact that LED 36 is off will reveal that low water level alone is causing the buzzer to sound.

The individual blocks in FIG. 4 represent individual circuits constructed from conventional, commercially available components. The blocks of FIG. 4 that have not previously been identified are: oscillator 66, demodulator 68, oscillator 70, falling edge detector 72, low battery warning circuit 74, NAND gates 76, 78, and 80, diodes 82 and 84, and a transistorized driver circuit 86.

Oscillator 66 and demodulator 68 are associated with sensor 38 in an important and unique manner. Oscillator 66 delivers a 3 Khz square wave signal to sensor 38 via one of the lead wires 40, 42. The other one of the lead wires is connected as an input to demodulator 68. Sensor 38 is not polarity sensitive, so it doesn't matter which one of the lead wires is connected to oscillator 66 so long as the other is connected to the demodulator input. When sensor 38 is out of water, there is no conductive path through the sensor and therefore the 3Khz oscillator signal is blocked from demodulator 68. Demodulator 68 has two output terminals 68A and 68B. The signal at one output is the opposite of the signal at the other. When sensor 38 is blocking the transmission of the 3 Khz signal to demodulator 68, the signal at terminal 68A is low (i.e., "0") and the signal at terminal 68B is high (i.e., "1"). When sensor 38 is in water, a conductive path is provided through it whereby the 3 Khz signal is transmitted to oscillator 68. Now the signal at terminal 68A goes high (i.e., "1") while the signal at terminal 68B goes low (i.e., "0"). Thus demodulator 68 provides logic level signals for indicating whether sensor 38 is in or out of water. As will be explained in greater detail later on, the application of an oscillating waveform signal to sensor 38 provides important advantages, and this sensing circuit 66, 38, 68 is a unique portion of the monitor.

Oscillator 70 delivers a 0.5 Khz square wave signal to FED 72. FED 72 is like a one-shot circuit in that in response to each falling edge (FE) of the 0.5 Khz square wave signal, FED 72 delivers an output pulse of fixed time duration. FED 72 supplies an output signal waveform to an input 76B of NAND gate 76, to an input 78B of NAND gate 78, and to an input 80A of NAND gate 80. Additional connections to NAND gates 76, 78, and 80 comprise: connection of output 68A of demodulator 68 to an input 76A of NAND gate 76; connection of output 68B of demodulator 68 to an input 78A of NAND gate 78; and connection of an output of low battery warning circuit 74 to an input 80B of NAND gate 80.

A NAND gate functions to deliver a low (i.e., a "0") output signal if and only if all input signals to it are high (i.e., "1"). Thus in the case of NAND gate 76, the output signal that it delivers to LED 34 will be low only when both inputs 76A and 76B are high. LED 34 is connected in circuit such that it lights only when the output 76C of NAND gate 76 is low, and it will therefore light only when both sensor 38 is in water (causing input 76A to be high) and a high pulse is being output by FED 72 (causing input 76B to be high). In this way, the condition of sensor 38 gates the output of FED 72 to LED 34 so that when sensor 38 is out of water, LED 34 does not light, but when the sensor is in water, LED 34 intermittently blinks at a 0.5 Hz repetition rate (i.e., every two seconds) with the duration of each blink corresponding to the width of the high pulse from FED 72.

When sensor 38 is out of water, a high signal is supplied from de-modulator output 68B to input 78A of NAND gate 78. The result is that the output 78C of NAND gate 78 is a signal that is the inverse of the signal from FED 72. The output 78C is connected to the cathode of diode 82, and the diode's anode is connected to circuit 86. The inverted pulses created by NAND gate 78 are coupled through diode 82 to be effective on circuit 86 such that circuit 86 intermittently energizes buzzer 64 at a two second repetition rate. In this way buzzer 64 emits a short beep every two seconds when sensor 38 is out of water.

When circuit 74 senses that battery voltage is above the threshold that distinguishes a weakening battery from a stronger one, the output signal that it delivers to input 80B is low. Consequently, the output 80C of NAND gate 80 remains high, LED 36 is connected in circuit such that a low signal from NAND gate 80 is required to turn it on, and therefore LED 36 remains off so long as circuit 74 senses battery voltage that is above the threshold. When battery voltage falls below the threshold, the output of NAND gate 80 becomes the inverse of the input signal waveform that is applied to input 80A from FED 72. As a result, LED 36 intermittently blinks every two seconds. The output pulses of NAND gate 80 that produce the blinks of LED 36 are also coupled via diode 84 to circuit 86, causing buzzer 64 to beep in synchronism with the blinking of LED 36. With this arrangement then, both LED 36 and buzzer 64 provide respective visible and audible signals when the battery weakens to a point where battery voltage drops below the threshold, irrespective of whether sensor 38 is in or out of water. If the battery voltage is above the threshold and the sensor is out of water, buzzer 64 will sound, but LED 36 will not light. Thus, when a person is alerted by the buzzer's sounding and checks the monitor, he or she will be aware that one or both of two possible causes are presently causing the buzzer to sound. By checking the status of LED's 34 and 36, the cause or causes can be identified. If both LED's are blinking, only the battery is the cause. If LED 34 is off and LED 36 is blinking, both water level and battery voltage are the causes. If both LED's are off, only water level is the cause.

Figure 5:
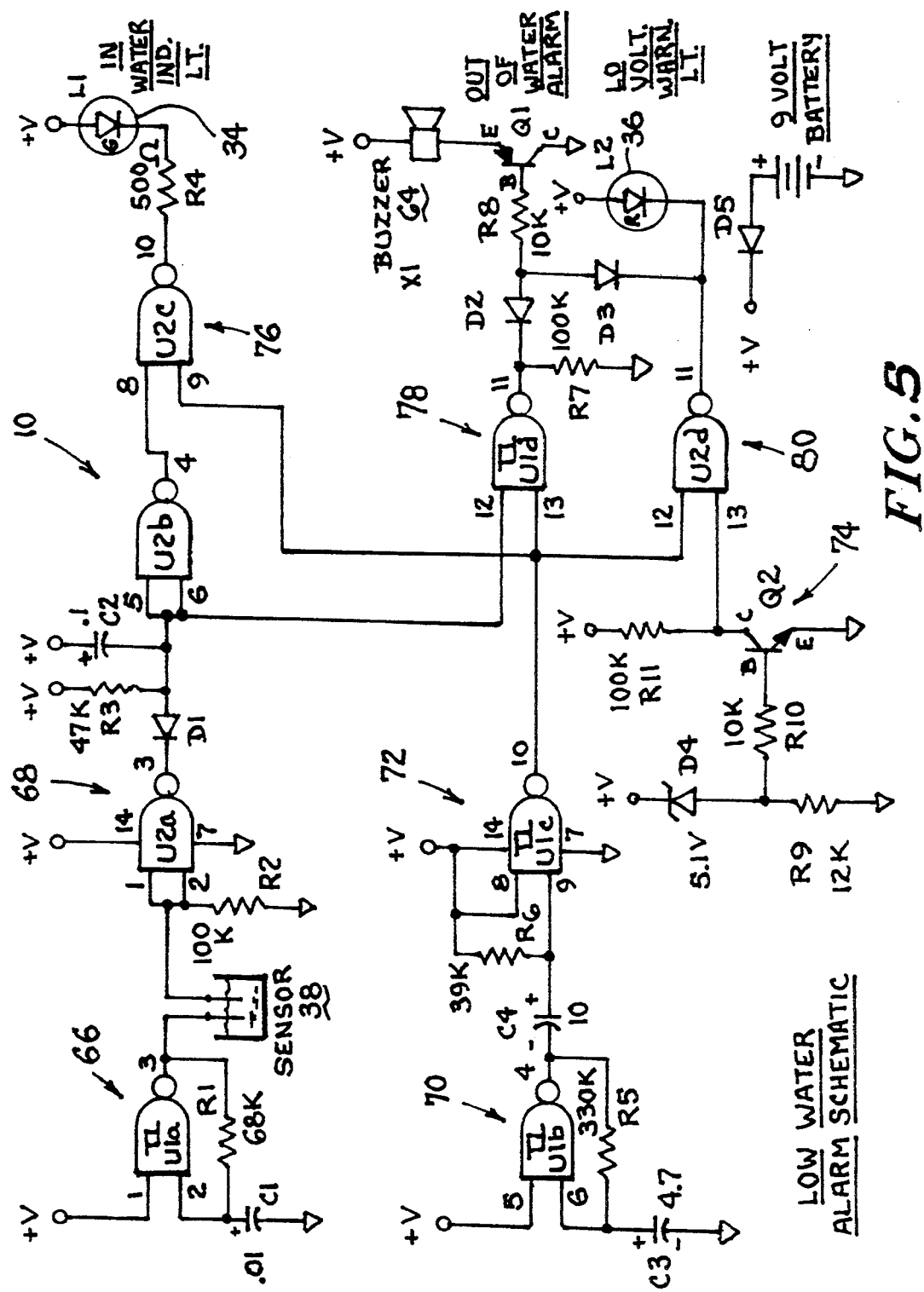
FIG. 5 is a detailed schematic diagram of FIG. 4.

FIG. 5 shows a detailed schematic diagram of FIG. 4. Oscillator 66 is constructed from a two-input NAND gate U1a, a capacitor C1, and a resistor R1 connected as shown. Conventional symbols for connection with the battery are shown throughout FIG. 5, and values of circuit components appear as indicated.

Demodulator 68 is fabricated from two two-input NAND gates U2a, U2b, resistor R3, diode D1, and capacitor C2 connected as shown. A resistor R2 is an input tiedown so that when the sensor is not in water, the inputs to NAND gate U2a will not float. NAND gate 76 comprises a single two-input NAND gate U2c. LED 34 has its anode connected directly to the positive supply terminal +V and its cathode connected through a resistor R4 to the output terminal of NAND gate U2c.

Oscillator 70 is constructed from a two-input NAND gate U1b, a capacitor C3, and a resistor R5 connected as shown. NAND gate 78 comprises a two-input NAND gate U1d, and NAND gate 80, a two-input NAND gate U2d. A resistor R7 is a tiedown so that the output terminal of NAND gate U1d will not float. Diodes 82, 84 (D2 and D3 in FIG. 5) keep the outputs of NAND gates 78 and 80 isolated from each other such that a low signal from either will operate buzzer 64 but a low signal from only NAND gate 78 will not operate LED 36, while a low signal from NAND gate 80 will operate both LED 36 and buzzer 64. Buzzer 64 is connected in a circuit with a resistor R8 and a PNP transistor Q1, as shown, for driving the buzzer from NAND gates 78 and 80.

Low battery warning circuit 74 comprises a zener diode D4, resistors R9, R10, R11, and an NPN transistor Q2 connected as shown. The zener voltage of zener diode D4 establishes the threshold voltage at which a low battery voltage warning is given. A nominal 9 volt D.C. battery will naturally weaken as it is used, in the absence of re-charging. Conventional electronic design practices therefore will use electronic components that are capable of properly operating at the nominal battery voltage and over a range of voltages below nominal. In the illustrated preferred embodiment, the circuitry is designed for operation over a range from +9 VDC down to about +5 VDC. In order to give a low battery voltage warning somewhat prior to depletion of the battery voltage to a point where the monitor will cease to operate, the threshold at which low battery voltage warning circuit 74 gives a warning is chosen, in this instance, at about +5.1 volts. Thus, after a monitor has been placed in service for a certain amount of time, a point is reached where the battery voltage drops below the warning level. At this point, the low battery voltage LED 36 lights and buzzer 64 sounds. There is still sufficient battery strength to operate the monitor for a limited amount of time, and it is anticipated that the user will take advantage of this opportunity to replace the old battery with a fresh one. Should the user be away from the premises greater than this limited amount of time, or should he or she fail to heed the warning, the monitor will eventually cease to operate. At that, a non-operating monitor will be evident by visual observation because both LED's and the buzzer will be continually off. The purpose of diode D5 is as a blocking diode so that if the battery terminals are reversed during installation, reverse voltage will not be applied to the system. Such reverse voltage could irreparably damage certain electronic components of the system, such as CMOS devices. It should also be mentioned that U1a, U1b, U1c, and U1d are sections of a quad two-input NAND gate, and U2a, U2b, U2c, and U2d are sections of a second such device.

It was mentioned earlier that the sensing circuit 66, 38, 68 is an important contributor to the monitor. One explanation of why this is true is appropriate. To a more or less significant extent, the environment in which the sensing circuit is used has an influence on the monitor. In the case of a Christmas tree stand, the water may become fouled due to the migration of sap, etc. from the cut trunk of the tree, chemicals may be added to the water for various purposes, such as to promote water absorption by the tree, and the mineral content of the water may be a factor. Initial development of the monitor contemplated using D.C. voltage sensing for water level sensing. It was discovered that this approach could not provide a monitor that would give a satisfactory service life. It was through further development efforts that the illustrated sensing circuit resulted.

When sensor 38 is out of water, no electric current is conducted through it. However, when the sensor is in water, current is conducted through it. Rather than being a D.C. current, this current is A.C. The creation of A.C. current has been found to be highly advantageous for minimizing contamination, or fouling, of sensor 38. The construction of sensor 38 is also a significant aspect of the invention, and attention is now directed to FIGS. 6 and 7.

Sensor 38 comprises a cylindrical housing 100 that has a circular cylindrical sidewall 102 and a cap 104 closing the upper end of sidewall 102. The lower end of sidewall 102 is open. Insulation is stripped away from the ends of lead wires 40, 42, and conductor-gripping portions 106, 108 of respective elongated electrical terminals 110, 112 are wrapped around the respective stripped ends of the lead wires 40, 42. Each terminal 110, 112 further comprises respective insulation-gripping portions 114, 116 that are wrapped onto the insulation immediately proximate the stripped end of the corresponding wire. In this way, terminals 110, 112 are securely joined, both mechanically and electrically, with their respective lead wires 40, 42.

Terminals 110, 112 are embedded within cap 104 such that a proximal portion of each, including the connection with the corresponding lead wire 40, 42, is internal to the cap, and a distal portion of each terminal projects from the cap into the space that is circumferentially bounded by sidewall 102. These distal portions of the terminals are mutually parallel and lie at opposite ends of a diameter of an imaginary circle that is concentric with a main longitudinal axis 118 of the sensor. The terminals are spaced inwardly from the I.D. of sidewall 102.

Immediately proximate cap 104, sidewall 102 is imperforate. This imperforate zone extends at least as far as the lower ends of the two terminals. Below this, sidewall 102 comprises a perforate zone, which in the illustrated embodiment, is one or more narrow slots 120 extending upward from the lower end of sidewall 102. Preferably these slots are narrow, about ⅛ inch wide.

Figure 6:
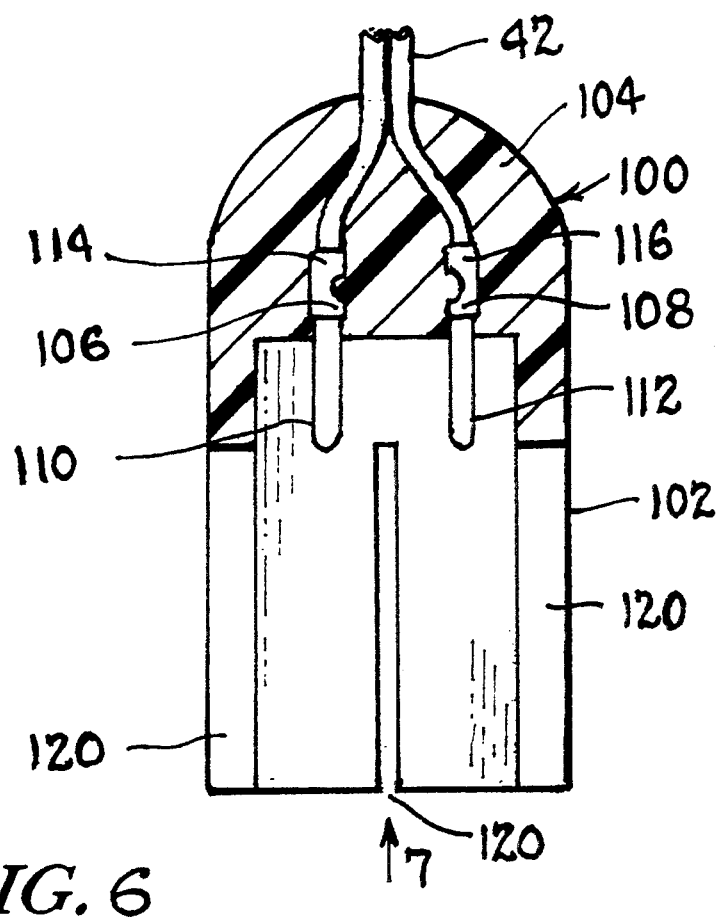
FIG. 6 is a longitudinal cross-sectional view through the sensor of the monitor.
Figure 7:
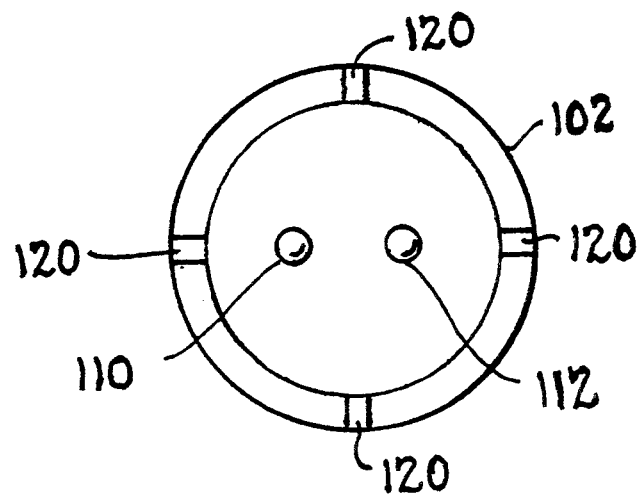
FIG. 7 is a full end view of the sensor in the direction of arrow 7 in FIG. 6.

So that the sensor can be suspended in water in the general orientation of FIG. 6, it is important that the sensor be sufficiently heavy, and that the water level will rise to the level of the lower tip ends of the terminals when the sensor is placed in water to the desired level. Since it is intended that the housing provide a protective enclosure for the terminals, it is preferred that the imperforate portion of sidewall 102 extend from cap 104 at least as far as the lower tip ends of the terminals. When the sensor is placed in water, it may be inclined, while submerged, to allow any air pocket that may be created within the interior to escape. Alternatively, very small holes could be included in this imperforate zone and/or the cap to allow trapped air to escape so that when the sensor is suspended at the desired level, and the stand contains water at least as high as that level, the water will bridge the two terminals, and as the water drops below that level, water will cease to bridge the terminals.

It can be further seen that sidewall 102 extends well below the two terminals. It is believed that a housing, such as the one illustrated, will provide good mechanical protection of the terminals in normal use. It may be appropriate to invoke certain measures, such as by a warning or other means, which will discourage a person from attempting to mechanically act on the terminals, such as by inserting a tool into the interior of the housing.

A feature of the invention is that the monitor can be used to indicate a fouled sensor, and a still further feature is that a fouled sensor can be readily de-fouled. A fouled sensor is indicated if LED 34 does not blink, assuming of course that the battery is not dead. A sensor can be de-fouled by immersing it in a solution of household vinegar and then operating the monitor for a short amount of time, typically twenty seconds or less.

Another important feature of the sensor is that terminals 110, 112 are gold-plated. The gold plate tends to resist fouling and gold is an excellent electrical conductor. A thin gold plate can be applied inexpensively to a conventional terminal like 110, 112. The process is readily available, and there is no need for a special order.

Yet another important feature of the sensor is that when removed from water, it does not retain water internally that could bridge the terminals and thereby falsely indicate that the sensor is in water.

Thus, the monitor of the invention possesses a combination of features that make it an economically and reasonably reliable and reasonably effective commercial product. Obviously, as is the case with any commercial product, the user must bear some responsibility for proper use, installation, and maintenance. The manufacturer and seller of the monitor can obviously not guarantee that it will prevent a tree from drying out. The monitor is however a device that definitely provide benefit at reasonable cost when installed, used, and maintained according to instructions. In a typical embodiment, a fresh battery will last 10–11 days on average so that over a typical holiday season, a battery may have to be replaced once.

A modified form that is not specifically shown in the drawings comprises operating buzzer 64 in ways that distinguish between whether the buzzer is being operated due to low fluid level or low battery voltage. In this way, a person may tell from only hearing the buzzer whether the cause of a signal being given is attributable to the fluid level or to the battery. A way to embody such a modified form without increasing the number of circuit components is to connect pin 12 of U2d to pin 4 of U1B instead of to pin 10 of U1c. In this way the duration of each beep from the buzzer is much longer when due to low battery voltage than when due to low fluid level.

While a presently preferred embodiment of the invention has been illustrated and described, principles are applicable to other embodiments falling within the scope of the following claims.

What is claimed is:

1. A battery-powered fluid level monitor comprising:
   a) a sensor for placement in a body of fluid to distinguish between fluid level that is above a certain level and fluid level that is below such certain level;
   b) visible signal means for providing visible signals regarding the operation of the monitor comprising,
      i) a first visible indicator, and
      ii) a second visible indicator;
   c) audible signal means for providing audible signals regarding the operation of the monitor; and
   d) an electronic circuit that is powered by a battery means and that serves to operatively couple said sensor with said visible signal means and said audible signal means, said electronic circuit comprising,
      i) means responsive to voltage of said battery means being greater than a certain threshold and said sensor sensing that fluid level is above such certain level for causing said first visible indicator to intermittently illuminate, said second visible indicator not to illuminate, and said audible signal means to be silent, ii) means responsive to voltage of said battery means being less than such certain threshold and said sensor sensing that fluid level is above such certain level for causing said first visible indicator to intermittently illuminate, said second visible indicator to intermittently illuminate, and said audible signal means to intermittently sound, and iii) means responsive to voltage of said battery means being greater than such certain threshold and said sensor sensing that fluid level is less than such certain level for causing said first visible indicator not to illuminate, said second visible indicator not to illuminate, and said audible signal means to intermittently sound.

2. A fluid level monitor as set forth in claim I in which said electronic circuit further comprises, iv) means responsive to voltage of said battery means being less than such certain threshold and said sensor sensing that fluid level is less than such certain level for causing said first visible indicator not to illuminate, said second visible indicator to intermittently illuminate, and said audible signal means to intermittently sound.

3. A fluid level monitor as set forth in claim 2 in which said electronic circuit comprises means for causing said audible signal means to intermittently sound in synchronism with the intermittent illumination of said second visible indicator when voltage of said battery means is less than such certain threshold and fluid level is less than such certain level.

4. A fluid level monitor as set forth in claim 1 in which said electronic circuit comprises means for causing said audible signal means to intermittently sound in synchronism with the intermittent illumination of said second visible indicator when voltage of said battery means is less than such certain threshold and fluid level is greater than such certain level.

5. A fluid level monitor as set forth in claim I in which said electronic circuit is packaged in a housing, said sensor is connected to said electronic circuit by wiring extending from said housing, and said visible indicators are packaged in a further housing and connected to said electronic circuit by wiring extending between said housings.

6. A fluid level monitor as set forth in claim 5 in which fluid level being monitored is the level of fluid in a Christmas tree stand, said housing that contains said electronic circuit is mounted on said stand, and said further housing is mounted on a Christmas tree supported by said stand.

7. A fluid level monitor as set forth in claim I in which said sensor comprises a pair of insulated wires having the insulation stripped away from each along common end segments, a pair of elongated electrical terminals each attached to a respective one of said common end segments of said wires and having electrical continuity with the electrical conductor of the respective wire, said terminals having respective distal ends that are arranged parallel and spaced apart side-by-side, said sensor further having a housing fabricated from an electrical non-conductor and comprising a transverse end wall and a cylindrical sidewall extending from said end wall, said common end segments of said pair of wires being embedded in said end wall such that only said distal ends of said terminals are exposed on one side of said end wall, said distal ends of said terminals being gold-plated, said sidewall of said housing being disposed outwardly in circumferentially bounding relation to said distal ends of said terminals, said sidewall comprising a perforate portion extending through said sidewall.

8. A fluid level monitor as set forth in claim 7 in which said sidewall's perforate portion comprises slots extending from an open end of said sensor housing that is opposite said end wall to at least as far as said distal ends of said terminals.

9. A fluid level monitor as set forth in claim 8 in which said sidewall of said housing is imperforate between said slots and said end wall.

10. A fluid level monitor as set forth in claim 1 in which said electronic circuit comprises an oscillator circuit and a demodulator circuit, and said sensor is connected in coupling relation between an output of said oscillator circuit and an input of said demodulator circuit such that when said sensor senses that fluid is above such certain level, the oscillator output is in conductive relation with the input of the demodulator, and when said sensor senses that fluid is below such certain level, the oscillator output is in non-conductive relation with the input of the demodulator.

11. A fluid level monitor as set forth in claim 10 in which said sensor comprises a pair of terminals that are spaced apart so as to provide a non-conductive path through the sensor when fluid is below such certain level and that are bridged by fluid to provide a conductive path through the sensor when fluid is above such certain level.

12. A fluid level monitor as set forth in claim 1 in which said audible signal means and said second visible indicator are operatively coupled by means, including diode means, such that operation of said audible signal means by said sensor sensing fluid level less than such certain level is prevented from also operating said second visible indicator.

13. A fluid level monitor as set forth in claim I in which said electronic circuit comprises a corresponding logic gate associated with each of said first visible indicator, said second visible indicator, and said audible signal means, each of said logic gates comprises a first input and a second input for controlling the output of the logic gate, each of said first visible indicator, said second visible indicator, and said audible signal means being connected with the output of the corresponding logic gate, and said second input of each logic gate being connected to a common source of pulses for establishing the intermittent operation of said first visible indicator, said second visible indicator, and said audible signal means.

14. A sensor for use with a battery-powered fluid level monitor to distinguish the level of fluid in a body of fluid being above a certain level from the level of fluid being below said certain level, said sensor comprising a pair of insulated wires having the insulation stripped away from each along common end segments, a pair of elongated electrical terminals each attached to a respective one of said common end segments of said wires and having electrical continuity with the electrical conductor of the respective wire, said elongated electrical terminals having respective distal ends that are arranged parallel and spaced apart side-by-side, said sensor further having a housing fabricated from an electrical non-conductor and comprising a transverse end wall and a cylindrical sidewall extending from said end wall, said common end segments of said pair of wires being embedded in said end wall such that only said distal ends of said electrical terminals are exposed on one side of said end wall, said distal ends of said electrical terminals being gold-plated, said sidewall of said housing being disposed outwardly in circumferentially surrounding relation to said distal ends of said electrical terminals, said sidewall having a first portion that is axially co-extensive with said distal ends of said electrical terminals and a second portion that extends axially beyond said first portion in a direction away from said housing end wall, said first portion of said sidewall being imperforate and said second portion being perforate.

15. A sensor as set forth in claim 14 in which said second portion of said sidewall comprises at least one slot extending from an open end of said sidewall that is opposite said end wall to at least said distal ends of said terminals.